(12) United States Patent
Wang et al.

(10) Patent No.: US 11,143,882 B2
(45) Date of Patent: Oct. 12, 2021

(54) LIQUID CRYSTAL LENS AND DISPLAY APPARATUS WITH LIQUID CRYSTAL LENS

(71) Applicant: BOE Technology Group Co., Ltd., Beijing (CN)

(72) Inventors: Haiyan Wang, Beijing (CN); Hui Li, Beijing (CN); Yunyun Tian, Beijing (CN); Zheng Fang, Beijing (CN); Hyun-Sic Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/737,533

(22) Filed: Jan. 8, 2020

(65) Prior Publication Data

US 2020/0183179 A1    Jun. 11, 2020

Related U.S. Application Data

(62) Division of application No. 15/023,183, filed as application No. PCT/CN2015/086233 on Aug. 6, 2015, now abandoned.

(30) Foreign Application Priority Data

Feb. 2, 2015    (CN) .......................... 201510053775.X (51) Int. Cl.
*G02B 30/27* (2020.01)
*G02F 1/1333* (2006.01)
(Continued)

(52) U.S. Cl.
CPC .............. *G02B 30/27* (2020.01); *G02F 1/137* (2013.01); *G02F 1/133345* (2013.01);
(Continued)

(58) Field of Classification Search
CPC combination set(s) only.
See application file for complete search history.

(56) References Cited

U.S. PATENT DOCUMENTS 7,855,756 B2    12/2010  Hong et al.
2003/0053016 A1*   3/2003  Kubota ............. G02F 1/133553
                                                    349/113
(Continued)

FOREIGN PATENT DOCUMENTS

CN          101424808 A      5/2009
CN          10-2096266    *  6/2011  ............... G02F 1/29
(Continued)

OTHER PUBLICATIONS

First Office Action from Chinese Patent Application No. 201510053775.X, dated Jan. 25, 2017, 11 pages.
(Continued)

*Primary Examiner* — Lauren Nguyen
(74) *Attorney, Agent, or Firm* — Westman, Champlin & Koehler, P.A.

(57) ABSTRACT

The present disclosure provides a liquid crystal lens and a display apparatus. The liquid crystal lens includes a first substrate and a second substrate arranged to be opposite to each other, a common electrode being provided on the second substrate; a liquid crystal layer interposed between the first and second substrates and including liquid crystal molecules; liquid crystal lens units, each of which includes a first group of strip-shaped electrodes and a second group of strip-shaped electrodes parallel to each other and spaced apart thereon, upon applying a voltage among the first and second groups, and the common electrode, a planoconvex lens is formed within the liquid crystal molecules between them, wherein each of the first and second groups includes layers of sub-electrodes insulated from each other, the
(Continued)

sub-electrodes of the first and second groups are applied with a voltage, so as to adjust symmetry of the planoconvex lens.

12 Claims, 7 Drawing Sheets

(51) Int. Cl.
*G02F 1/1343* (2006.01)
*G02F 1/137* (2006.01)
*G02F 1/29* (2006.01)
*G02F 1/35* (2006.01)

(52) U.S. Cl.
CPC ........ *G02F 1/134309* (2013.01); *G02F 1/294* (2021.01); *G02F 1/3503* (2021.01)

(56) References Cited

U.S. PATENT DOCUMENTS

2010/0302490 A1    12/2010  Chiu
2015/0138456 A1*   5/2015   Liao ......................... G02F 1/29
                                                    349/15

FOREIGN PATENT DOCUMENTS

| CN | 102096266 A | 6/2011 |
| CN | 102323702 A | 1/2012 |
| CN | 102809868 A | 12/2012 |
| CN | 103091931 A | 5/2013 |
| CN | 103605245 A | 2/2014 |
| CN | 103984181 A | 8/2014 |
| CN | 104317133 A | 1/2015 |
| CN | 204101861 U | 1/2015 |
| CN | 104570542 A | 4/2015 |
| KR | 20120017308 A | 2/2012 |

OTHER PUBLICATIONS

Second Office Action, including Search Report, for Chinese Patent Application No. 201510053775.X, dated Aug. 1, 2017, 11 pages.
Third Office Action for Chinese Patent Application No. 201510053775.X, dated Jan. 19, 2018, 13 pages.
International Search Report and Written Opinion for International Application No. PCT/CN2015/086233, dated Nov. 11, 2015, 9 pages.
English translation of Box No. V of the Written Opinion for the International Searching Authority for International Application No. PCT/CN2015/086233, 2 pages.

* cited by examiner

LIQUID CRYSTAL LENS AND DISPLAY APPARATUS WITH LIQUID CRYSTAL LENS

CROSS-REFERENCE TO RELATED APPLICATION

This application is a divisional application of U.S. application Ser. No. 15/023,183, filed on Mar. 18, 2016 which published as U.S. Publication No. 2016/0357023 A1, on Dec. 8, 2016, which is a Section 371 National Stage Application of International Application No. PCT/CN2015/086233, filed on Aug. 6, 2015, entitled "Liquid Crystal Lens and Display Apparatus", which has not yet published, and which claims priority to Chinese Patent Application No. 201510053775.X, filed on Feb. 2, 2015, incorporated herein by reference in their entireties.

BACKGROUND OF THE INVENTION

Field of the Invention

The present invention relates to a technical field of display, more particular to a liquid crystal lens and a display apparatus.

Description of the Related Art

Figure 1:
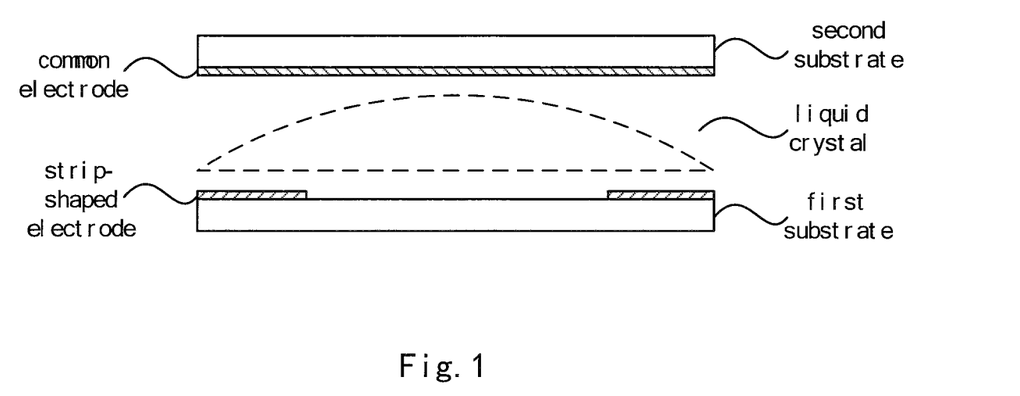
FIG. 1 is a schematic view showing a structure of a liquid crystal lens in the prior art.

The existing 3D display apparatus normally employs a liquid crystal lens provided on a 2D display panel. Currently, the liquid crystal lens is mainly formed as follows. As shown in FIG. 1, a planoconvex lens is formed by two strip-shaped electrodes, which are applied with equal voltages. Each strip-shaped electrode makes the liquid crystal molecules therebetween to generate the same degree of defection, thereby forming the planoconvex lens as shown by dashed lines. One liquid crystal lens is made up of a plurality of planoconvex lenses.

Each planoconvex lens corresponds to certain pixel units, and is configured to converge a left eye figure onto a left eye of a person and a right eye figure into a right eye of the person, thereby achieving an object of 3D display.

Figure 2:
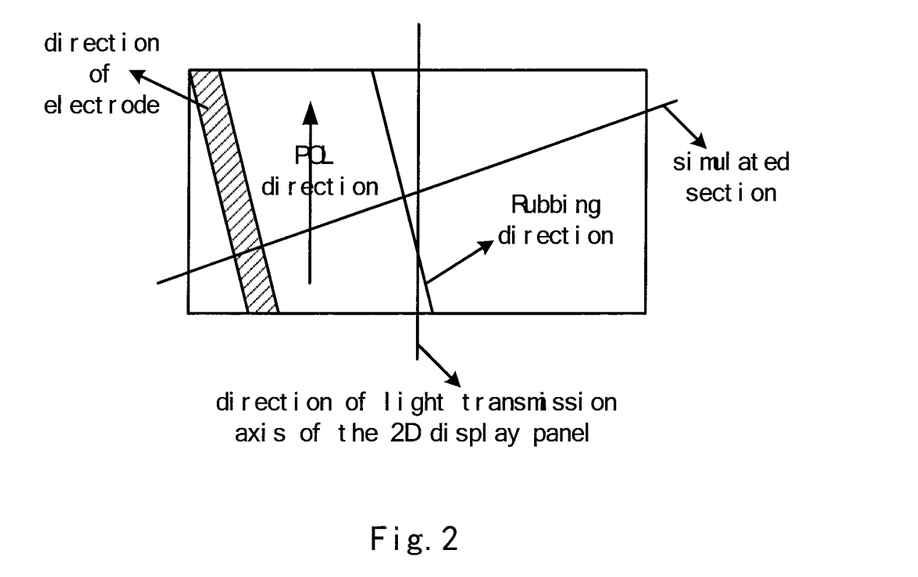
FIG. 2 is a schematic view about relationship of a direction of a simulated section in the liquid crystal lens with a light transmission axis of a 2D display panel.
Figure 3:
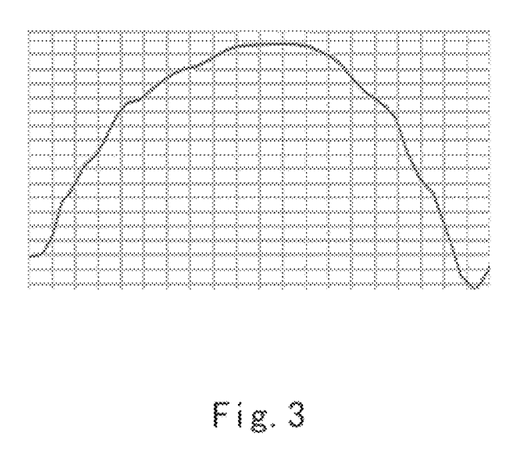
FIG. 3 is a schematic view of simulated symmetry of the planoconvex lens of the liquid crystal lens as shown in FIG. 1 in a condition of FIG. 2.

The above described planoconvex lens can only ensure to have relatively high symmetry and phase delay, in a case that a light transmission axis of 2D display panel is parallel to the strip-shaped electrode and a Rubbing direction and all of them are perpendicular to a simulated section. In the condition that the strip-shaped electrode and the Rubbing direction are perpendicular to the simulated section and there is a certain angle between the simulated section and the light transmission axis of the 2D display panel as shown in FIG. 2, it is difficult to guarantee the formed planoconvex lens to have the relatively high symmetry and the phase delay. For example, there is an angle between the light transmission axis of the 2D display panel (i.e., a POL direction of the 2D display panel) and the direction of the simulated section, in a range of 53 to 90 degrees. When the angle is 71.57 degrees, the shape of the planoconvex lens by simulation is shown in FIG. 3. The symmetry is relative low, resulting in large crosstalk and relatively small phase delay.

SUMMARY OF THE INVENTION

An object of the present invention is to eliminate or at least alleviate the defects existing in the prior art as described above, so that the planoconvex lens formed in the liquid crystal molecules can still have relatively high symmetry, even through in the case that there is an angle between the direction of simulated section and the light transmission axis of the 2D display panel.

In accordance with one aspect of the present invention, it provides a liquid crystal lens, comprising:
a first substrate;
a second substrate arranged to be opposite to the first substrate, wherein a common electrode is provided on the second substrate;
a liquid crystal layer interposed between the first and second substrates and comprising a plurality of liquid crystal molecules;
a plurality of liquid crystal lens units, each of which comprises a first group of strip-shaped electrodes and a second group of strip-shaped electrodes parallel to each other and spaced apart on the first substrate, upon applying a voltage among the first group of strip-shaped electrodes, the second group of strip-shaped electrodes and the common electrode, a planoconvex lens is formed within the liquid crystal molecules between the common electrode and the first and second groups of strip-shaped electrodes,
wherein each of the first and second groups of strip-shaped electrodes comprises a plurality of layers of sub-electrodes insulated from each other, the sub-electrodes of the first group of strip-shaped electrodes and the sub-electrodes of the second group of strip-shaped electrodes are applied with a voltage, so as to adjust symmetry of the planoconvex lens.

In one example, a width of each layer of sub-electrode in the first group of strip-shaped electrodes and/or a width of each layer of sub-electrode in the second group of strip-shaped electrodes decrease progressively in a vertical direction from the first substrate to the second substrate.

In one example, all of layers of sub-electrodes in the first group of strip-shaped electrodes have projections coinciding with each other on the first substrate at an end of a side away from the second group of strip-shaped electrodes, and/or
all of layers of sub-electrodes in the second group of strip-shaped electrodes have projections coinciding with each other on the first substrate at an end of a side away from the first group of strip-shaped electrodes.

In one example, in the first and second groups of strip-shaped electrodes, the widths of the sub-electrodes within a same layer of at least one layer of sub-electrode are different.

In one example, a number of layers of sub-electrodes within the first group of strip-shaped electrodes is identical with or different from that of layers of sub-electrodes within the second group of strip-shaped electrodes.

In one example, a thickness of each layer of sub-electrode in the first group of strip-shaped electrodes is a first thickness, a thickness of each layer of sub-electrode in the second group of strip-shaped electrodes is a second thickness, and the first thickness is equal or not equal to the second thickness.

In one example, thicknesses of at least two layers of sub-electrodes in the first group of strip-shaped electrodes are different from each other, and/or thicknesses of at least two layers of sub-electrodes in the second group of strip-shaped electrodes are different from each other.

In one example, each layer of sub-electrode in the first group of strip-shaped electrodes is applied with a first voltage, each layer of sub-electrode in the second group of strip-shaped electrodes is applied with a second voltage, and the first voltage is equal or not equal to the second voltage.

In one example, at least two layers of sub-electrodes in the first group of strip-shaped electrodes are applied with different voltages, and/or at least two layers of sub-electrodes in the second group of strip-shaped electrodes are applied with different voltages.

In one example, an insulation layer is provided between each two adjacent layers of sub-electrodes in the first group of strip-shaped electrodes, an insulation layer is provided between each two adjacent layers of sub-electrodes in the second group of strip-shaped electrodes, wherein thicknesses of at least two insulation layers in the first group of strip-shaped electrodes are different or equal, and/or thicknesses of at least two insulation layers in the second group of strip-shaped electrodes are different or equal.

In one example, an insulation part is provided between adjacent liquid crystal lens units.

In one example, in adjacent liquid crystal lens units, the first group of strip-shaped electrodes of one liquid crystal lens unit is adjacent to the first group of strip-shaped electrodes or the second group of strip-shaped electrodes of another liquid crystal lens unit.

In accordance with another aspect of the present invention, it provides a display apparatus, comprising the liquid crystal lens as described above and a display panel, wherein the liquid crystal lens is provided on a light exiting face of the display panel.

In respective embodiments of the present invention, the planoconvex lens is formed by two groups of strip-shaped electrodes having a multiple layer structure. In addition, conditions and parameters such as voltage of electrodes, the thickness of electrode, the width of the electrode, the number of layers of electrode, and the thickness of the insulation layer or the like can be considered comprehensively, so that in the case that there is an angle between the direction of simulated section and the light transmission axis of the 2D display panel, the planoconvex lens in the formed liquid crystal lens still has relatively high symmetry, thereby only generating relative low crosstalk and relative large phase delay.

BRIEF DESCRIPTION OF THE DRAWINGS

Features and advantages of the present invention can be better understood by referring to the drawings, and the drawings are schematic rather than to make any limitation to the present invention, wherein.

Explanation of Reference Numbers:
1 first substrate; 2 second substrate; 3 liquid crystal layer; 4 first group of strip-shaped electrodes; 41, 42, 43 sub-electrodes of the first group of strip-shaped electrodes; 5 second group of strip-shaped electrodes; 51, 52, 53 sub-electrodes of the second group of strip-shaped electrodes; 6 common electrode; 7 insulation layer; 8 insulation part; 10 liquid crystal lens unit

DETAINED DESCRIPTION OF PREFERRED EMBODIMENTS OF THE INVENTION

In order to clearly understand the above objects, features and advantages of the present invention, the specific embodiments of the present invention are described in detail with reference to the accompanying drawings. Please be noted that embodiments and features of the embodiments of the present application can be combined with each other, without any conflict.

Numerous details are set out in the following for better understanding the present invention. However, the present invention can also be implemented by other embodiments except those described herein. Therefore, the scope of the present invention is not limited to the disclosed embodiments.

Figure 4:
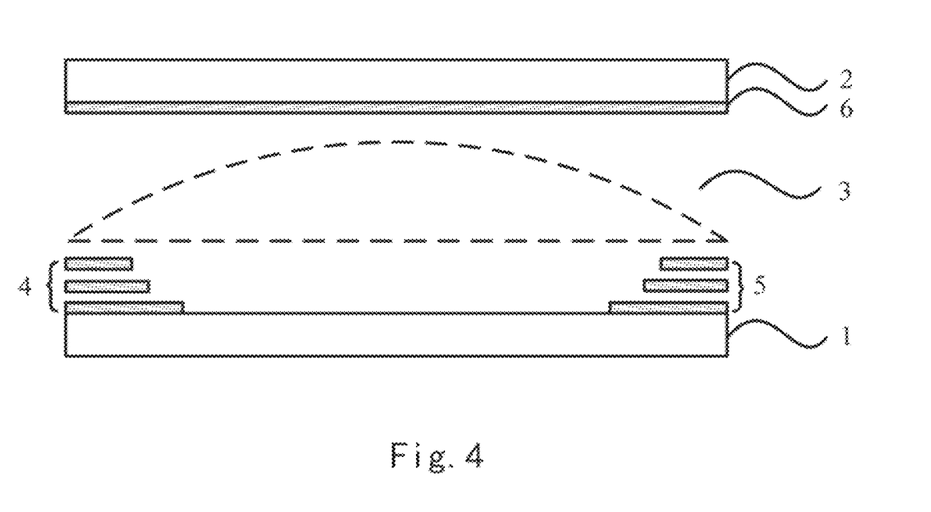
FIG. 4 is a schematic view showing a structure of a liquid crystal lens in accordance with a first embodiment of the present invention.

As shown in FIG. 4, a liquid crystal lens in accordance with a first embodiment of the present invention includes a first substrate 1 and a second substrate 2 provided to be opposite to each other; and a liquid crystal layer 3 interposed between the first and second substrates 1 and 2. The second substrate 2 is provided with a common electrode 6, and the liquid crystal layer 3 includes a plurality of liquid crystal molecules (not shown).

Figure 5:
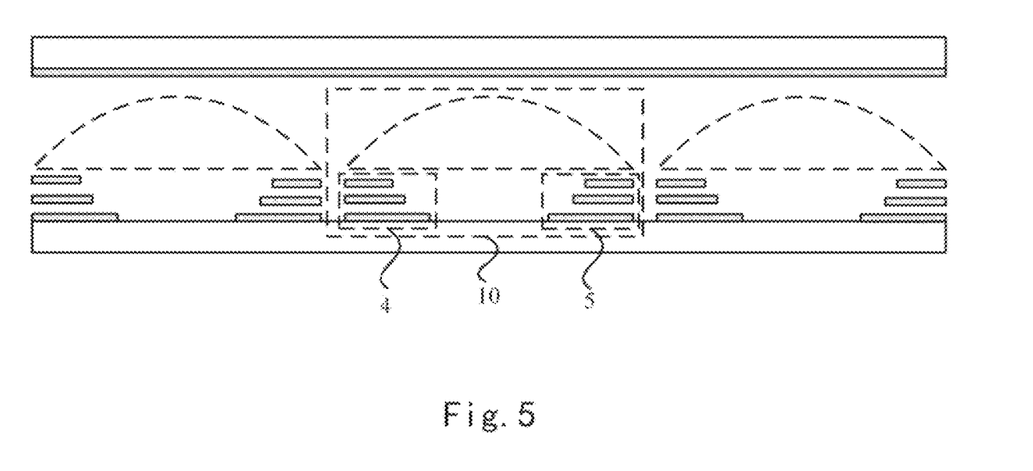
FIG. 5 is a schematic view showing another structure of the liquid crystal lens as shown in FIG. 4.

The liquid crystal lens further includes at least one liquid crystal lens unit, for example, only one liquid crystal lens unit as shown in FIG. 4. In another embodiment, the liquid crystal lens includes a plurality of liquid crystal lens units 10 (as shown in FIG. 5). Each liquid crystal lens unit 10 includes a first group of strip-shaped electrodes 4 and a second group of strip-shaped electrodes 5 parallel to each other and spaced apart on the first substrate 1. When a voltage is applied among the first group of strip-shaped electrodes 4, the second group of strip-shaped electrodes 5 and the common electrode 6, the liquid crystal molecules among the first group of strip-shaped electrodes 4, the second group of strip-shaped electrodes 5 and the common electrode 6 are formed as a planoconvex lens. Each of the first group of strip-shaped electrodes 4 and the second group of strip-shaped electrodes 5 includes a plurality of layers of sub-electrodes insulated from each other. The sub-electrodes 41, 42, 43 (as described below) of the first group of strip-shaped electrodes 4 and the sub-electrodes 51, 52, 53

(as described below) of the second group of strip-shaped electrodes 5 are respectively applied with a voltage, so as to adjust the symmetry of the planoconvex lens.

The two groups of strip-shaped electrodes having a structure of multiple layers are energized to deflect the liquid crystal molecules. Because the sub-electrodes of the strip-shaped electrodes in the multiple layer structure from bottom to up are more and more close to the liquid crystal molecules, the electric fields generated after energizing are different and thus each layer of electrode makes the liquid crystal molecules deflect differently. The synthesized electric field formed by the electric fields of the sub-electrodes makes the liquid crystal molecules generate more complex deflection. Therefore, the formed planoconvex lens can approximately adjust symmetry thereof and ensure it in the liquid crystal molecules still to have relatively high symmetry (degree), in a case that there is an angle between the direction of simulated section and the light transmission axis of the 2D display panel.

Preferably, the width of each layer of sub-electrode in the first group of strip-shaped electrodes 4 and/or the width of each layer of sub-electrode in the second group of strip-shaped electrodes 5 decrease progressively in a vertical direction from the first substrate 1 to the second substrate 2 (the up and down direction as shown in FIG. 4 or 5). In the present disclosure, the width of each layer of sub-electrode is meant to a distance in a left to right direction of a page in FIG. 4 or 5 or a distance in a direction from the first group of strip-shaped electrodes 4 to the second group of strip-shaped electrodes 5.

The width of each layer of sub-electrode decreases in the direction from up to bottom as shown in FIG. 4 or 5, which makes the electric field lines more dense in the electric field generated by the sub-electrodes more close to the top and the electric field lines more sparse in the electric field generated by the sub-electrodes more close to the bottom, thereby the liquid crystal molecules can generate the relatively large deflection at a position corresponding to the sub-electrodes at the top and generate the relatively small deflection at a position corresponding to the sub-electrodes at the bottom. In this way, the planoconvex lens formed between the two groups of strip-shaped electrodes and the common electrode has a more consistent curvature, becomes smoother and has relatively high symmetry.

Preferably, all of layers of sub-electrodes in the first group of strip-shaped electrodes 4 have projections coinciding with each other on the first substrate 1 at an end of a side away from the second group of strip-shaped electrodes 5; and/or all of layers of sub-electrodes in the second group of strip-shaped electrodes 5 have projections coinciding with each other on the first substrate 1 at an end of a side away from the first group of strip-shaped electrodes 4.

In this way, it can ensure the liquid crystal lens is formed only by the group of strip-shaped electrodes with the other group of strip-shaped electrodes within the same liquid crystal lens unit; the influence to the liquid crystal molecules corresponding to the groups of strip-shaped electrodes in the adjacent liquid crystal lens unit thereto is very small, and further ensure the regularity of each formed planoconvex lens.

One lens grating can be formed by a plurality of planoconvex lenses, so as to transfer the image of the corresponding pixel unit to the left eye or the right eye of the user, thereby achieving the object of 3D display.

Figure 6:
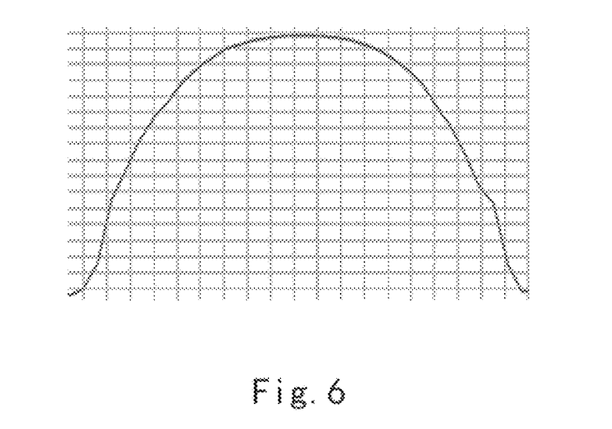
FIG. 6 is a schematic view of a simulated symmetry of the planoconvex lens in the liquid crystal lens as shown in FIG. 4.

As shown in FIG. 6, the planoconvex lens in the liquid crystal lens formed in accordance with the first embodiment of the present invention has relatively high symmetry compared to that in the prior art, in a condition that there is an angle between the direction of simulated section and the light transmission axis of the 2D display panel. Furthermore, there is relatively large difference between the maximum refractive index and the minimum refractive index of the formed liquid crystal lens (for indicating the generated phase delay).

Figure 7:
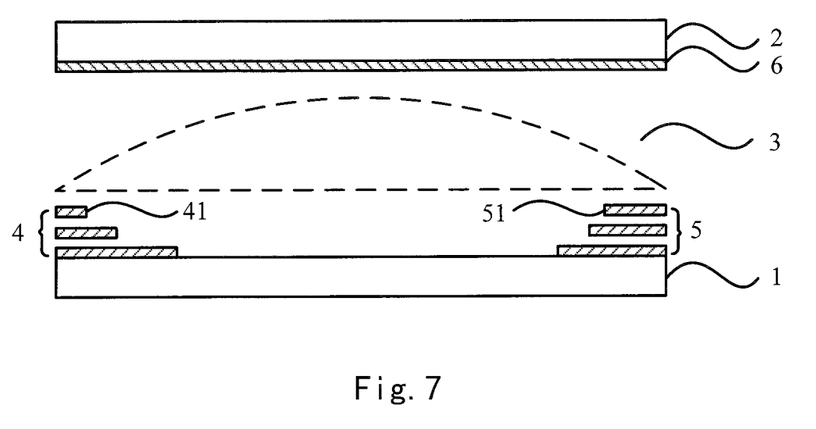
FIG. 7 is a schematic view showing a structure of a liquid crystal lens in accordance with a second embodiment of the present invention.

As shown in FIG. 7, preferably, within the first and second groups of strip-shaped electrodes 4 and 5, the sub-electrodes within the same layer among the at least one layers have different widths.

For example, the top sub-electrode 41 of the first group of strip-shaped electrodes 4 is located at the same layer as the top sub-electrode 51 of the second group of strip-shaped electrodes 5, but they have different widths. In one example, the width of the sub-electrode 41 is smaller than that of the sub-electrode 51; of course, it is also possible to set the width of the sub-electrode 41 wider than that of the sub-electrode 51 as required. Thus, the sub-electrode 41 and the sub-electrode 51 can form different electric fields respectively, and further it enables the liquid crystal molecules to have different deflection degrees. In the case that there is the angle between the direction of the simulated section and the light transmission axis of the 2D display panel, it can further ensure the planoconvex lens formed in the liquid crystal still has relatively high symmetry.

Figure 8:
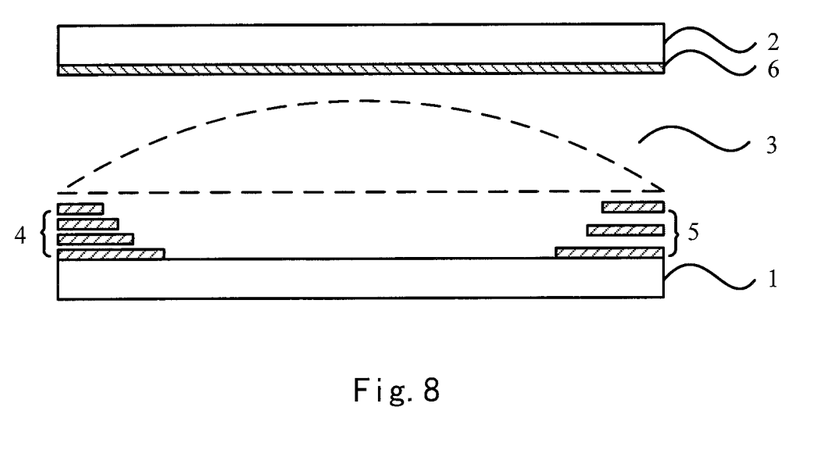
FIG. 8 is a schematic view showing a structure of a liquid crystal lens in accordance with a third embodiment of the present invention.

As shown in FIG. 8, preferably, the number of layers of sub-electrodes in the first group of strip-shaped electrodes 4 is different from that of layers of sub-electrodes in the second group of strip-shaped electrodes 5.

The numbers of layers of sub-electrodes in the first and second groups of strip-shaped electrodes 4 and 5 may be different from each other, for example, the first group of strip-shaped electrodes 4 includes four layers of sub-electrodes, and the second group of strip-shaped electrodes 5 includes three layers of sub-electrodes. Of course, it is possible to set the number of layers of sub-electrodes in the first group of strip-shaped electrodes 4 to be larger than that of layers of sub-electrodes in the second group of strip-shaped electrodes 5. Therefore, the first and second groups of strip-shaped electrodes 4 and 5 respectively generate different electric fields; and thus deflect the liquid crystal molecules differently. In this way, in the case that there is the angle between the direction of the simulated section and the light transmission axis of the 2D display panel, it can further ensure that the planoconvex lens formed in the liquid crystal molecules still has the relatively high symmetry.

Figure 9:
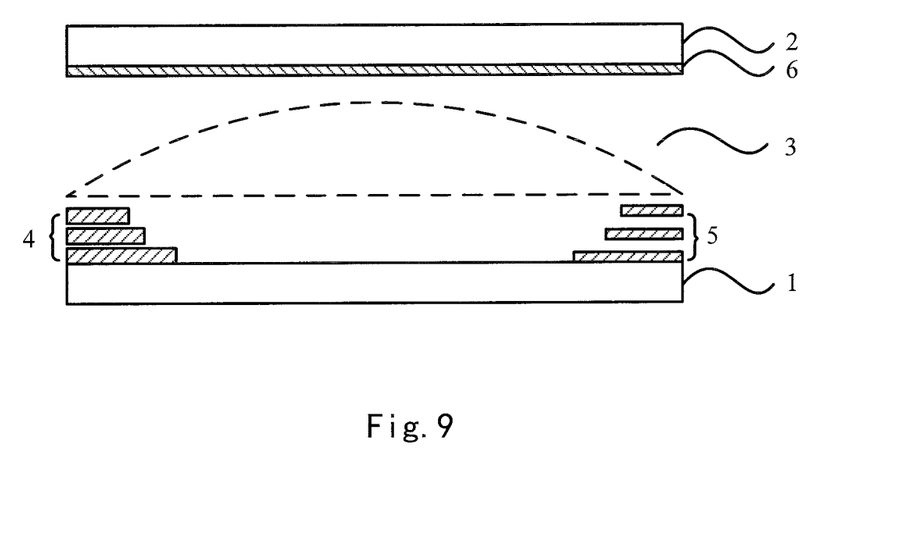
FIG. 9 is a schematic view showing a structure of a liquid crystal lens in accordance with a fourth embodiment of the present invention.

As shown in FIG. 9, preferably, the thickness of each layer of sub-electrode in the first group of strip-shaped electrodes 4 is a first thickness, the thickness of each layer of sub-electrode in the second group of strip-shaped electrodes 5 is a second thickness, and the first thickness is not equal to the second thickness. Please be noted that each layer of sub-electrode of the first and second groups of strip-shaped electrodes 4 and 5 as shown in FIGS. 4-8 has an equal thickness.

The thickness of each layer of subelectrode in the first group of strip-shaped electrodes 4 might not be equal to that of each layer of sub-electrode in the second group of strip-shaped electrodes 5, for example the thickness of each layer of sub-electrode in the first group 4 is larger than that of each layer of sub-electrode in the second group 5. Of course, it is possible to set the thickness of each layer of sub-electrode in the first group of strip-shaped electrodes 4 to be smaller than that of each layer of sub-electrode in the second group of strip-shaped electrodes 5. Thus, the first and second groups of strip-shaped electrodes 4 and 5 respectively generate different electric fields; and thus deflect the liquid crystal molecules differently. In this way, in the case that there is the angle between the direction of the simulated section and the light transmission axis of the 2D display panel, it can further ensure that the planoconvex lens formed in the liquid crystal molecules still has the relatively high symmetry.

Figure 10:
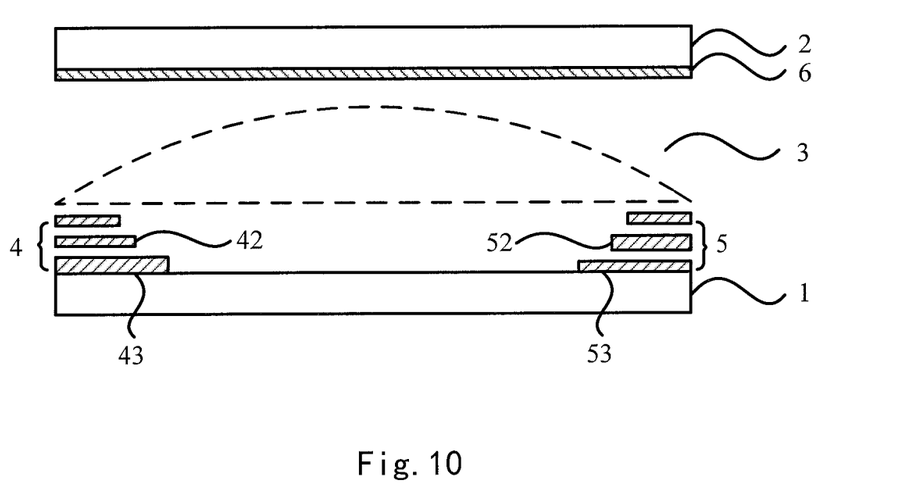
FIG. 10 is a schematic view showing a structure of a liquid crystal lens in accordance with a fifth embodiment of the present invention.

As shown in FIG. 10, preferably, at least two layers of sub-electrodes in the first group of strip-shaped electrodes 4 have thicknesses different from each other; and/or at least two layers of sub-electrodes in the second group of strip-shaped electrodes 5 have thicknesses different from each other.

For example, the sub-electrode 42 in the first group of strip-shaped electrodes 4 has a different thickness from that of the sub-electrode 43 thereof; and the sub-electrode 52 in the second group of strip-shaped electrodes 5 has a different thickness from that of the sub-electrode 53 thereof. Of course, it is also possible to set the thickness of other layers of sub-electrodes as required. On basis of this, each layer of sub-electrode in the first and/or second groups of strip-shaped electrodes 4 and 5 can generate different electric field. Thus, the first and second groups of strip-shaped electrodes 4 and 5 respectively generate different electric fields; and thus deflect the liquid crystal molecules by different degrees. In this way, in the case that there is the angle between the direction of the simulated section and the light transmission axis of the 2D display panel, it can further ensure that the planoconvex lens formed in the liquid crystal molecules still has the relatively high symmetry.

As an example, in respective embodiments of the present invention, each layer of sub-electrode in the first group of strip-shaped electrodes 4 is applied with a first voltage, each layer of sub-electrode in the second group of strip-shaped electrodes 5 is applied with a second voltage, and the first and second voltages are equal or not equal.

The electric field generated by the electrodes is correlated to the voltage provided to them. Each layer of sub-electrode in the first group of strip-shaped electrodes 4 and each layer of sub-electrode in the second group of strip-shaped electrodes 5 are provided with different voltages, so that each layer of sub-electrode therein can respectively generate different electric fields. Thus, the first and second groups of strip-shaped electrodes 4 and 5 respectively generate different electric fields; and thus deflect the liquid crystal molecules by different degrees. In this way, in the case that there is the angle between the direction of the simulated section and the light transmission axis of the 2D display panel, it can further ensure that the planoconvex lens formed in the liquid crystal molecules still has the relatively high symmetry.

Preferably, in respective embodiments of the present invention, at least two layers of sub-electrodes in the first group of strip-shaped electrodes 4 are applied with different voltages; and/or at least two layers of sub-electrodes in the second group of strip-shaped electrodes 5 are applied with different voltages.

By applying different voltages to the respective layers of sub-electrodes in the first group of strip-shaped electrodes 4 and/or to the respective layers of sub-electrodes in the second group of strip-shaped electrodes 5, the respective layers of sub-electrode in the first group of strip-shaped electrodes 4 and/or the respective layers of sub-electrode in the second group of strip-shaped electrodes 5 are configured to generate different electric field, thereby the first and second groups of strip-shaped electrodes 4 and 5 respectively generate different electric fields; and thus deflect the liquid crystal molecules by different degrees. In this way, in the case that there is the angle between the direction of the simulated section and the light transmission axis of the 2D display panel, it can further ensure that the planoconvex lens formed in the liquid crystal molecules still has the relatively high symmetry.

As an example, when each layer of sub-electrode in the first and second groups of strip-shaped electrodes 4 and 5 is energized with an equal voltage, the numbers of the layers of sub-electrodes in the first and second groups of strip-shaped electrodes 4 and 5 are different.

As an example, when the number of the layer of sub-electrode in the first group of strip-shaped electrode 4 is identical with that of the layer of sub-electrode in the second group of strip-shaped electrode 5, the sub electrode (i.e., one layer or multiple layers of sub-electrodes) in the first group of strip-shaped electrodes 4 is applied with different voltage from the sub-electrode (i.e., one layer or multiple layers of sub-electrodes) in the second group of strip-shaped electrodes 5.

Figure 11:
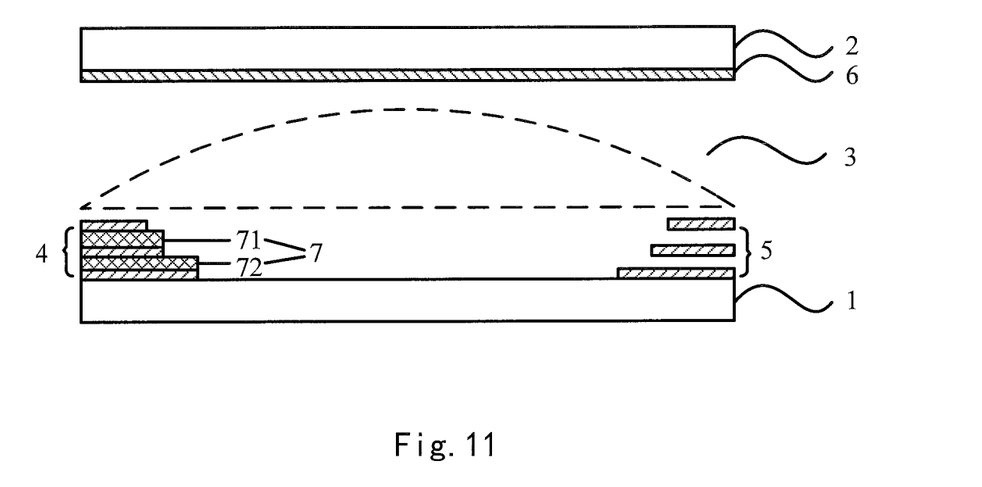
FIG. 11 is a schematic view showing a structure of a liquid crystal lens in accordance with a sixth embodiment of the present invention.

As shown in FIG. 11, as an example, an insulation layer 7 is provided between every two adjacent layers of sub-electrodes in the first group of strip-shaped electrodes 4 and an insulation layer 7 is provided between every two adjacent layers of sub-electrodes in the second group of strip-shaped electrodes 5, wherein at least two insulation layers of the first group of strip-shaped electrodes 4 have different thicknesses, and/or at least two insulation layers of the second group of strip-shaped electrodes 5 have different thicknesses.

For example, the insulation layer 7 provided within the first group of strip-shaped electrodes 4 has two sub-layers, one (sub-insulation layer 71) of which has the thickness larger than that of the other sub-insulation layer 72. Of course, the second group of strip-shaped electrodes 5 can be provided with such insulation layer, but not shown in the drawing and the thickness thereof can be set according to the actual requirement. The provision of the insulation layer between every two layers of sub-electrodes can ensure the insulation between the adjacent layers of sub-electrodes, and avoid the short circuit of the adjacent electrodes. The superposed electric field formed by the layers of sub-electrodes will be influenced by the insulation layer provided therein. By virtue of the provision of the insulation layer having different thicknesses between every adjacent two layers of sub-electrodes, the first and second groups of strip-shaped electrodes 4 and 5 will respectively generate different electric fields; and thus deflect the liquid crystal molecules by different degrees. In this way, in the case that there is the angle between the direction of the simulated section and the light transmission axis of the 2D display panel, it can further ensure that the planoconvex lens formed in the liquid crystal molecules still has the relatively high symmetry.

Figure 12:
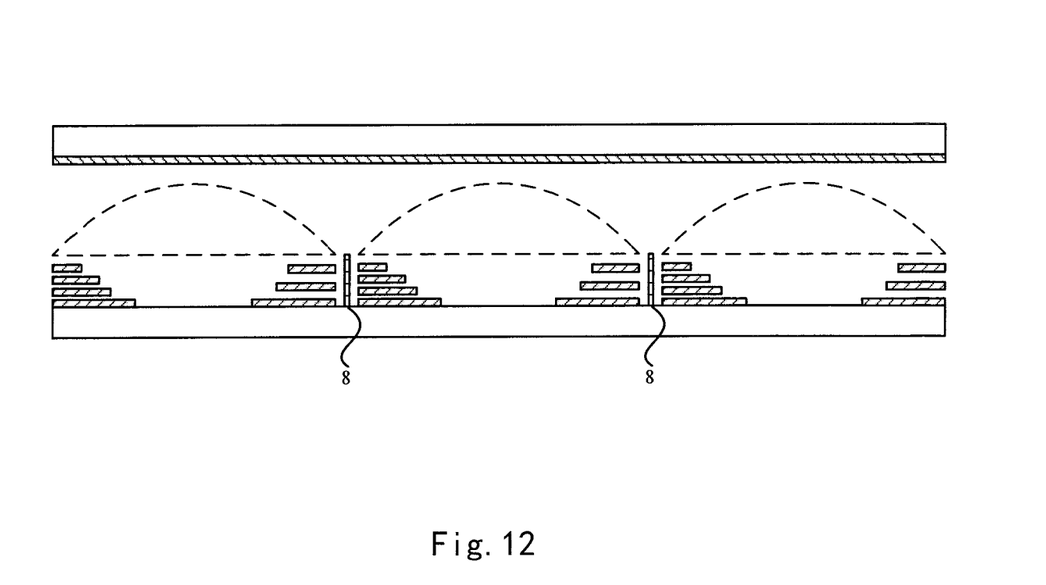
FIG. 12 is a schematic view showing a structure of a liquid crystal lens in accordance with a seventh embodiment of the present invention.

As shown in FIG. 12, it is preferable to provide an insulation part 8 between adjacent liquid crystal lens units 10 in respective embodiments of the present invention.

The insulation part 8 can ensure no occurrence of short circuit between two adjacent groups of strip-shaped electrodes in two adjacent liquid crystal lens units 10.

Figure 13:
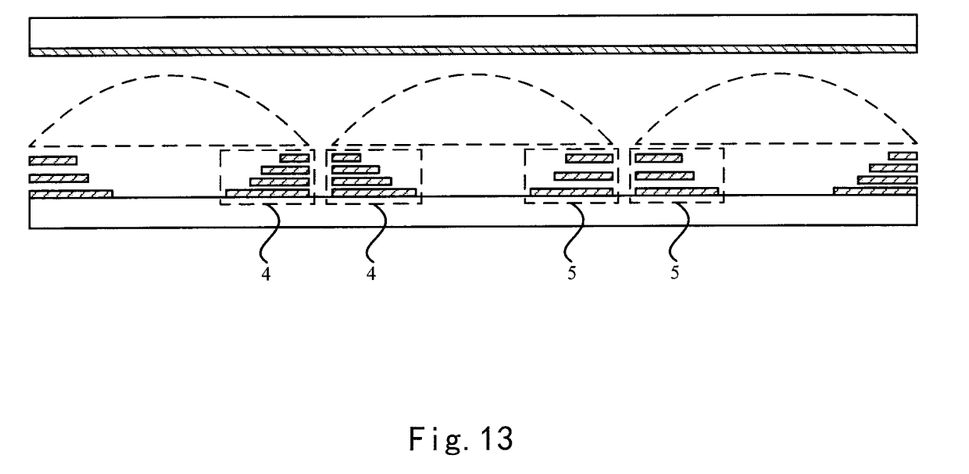
FIG. 13 is a schematic view showing a structure of a liquid crystal lens in accordance with an eighth embodiment of the present invention.

Preferably, in two adjacent liquid crystal lens units 10, a first group of strip-shaped electrodes 4 in one liquid crystal lens unit 10 is adjacent to a first group of strip-shaped electrodes 4 or a second group of strip-shaped electrodes 5 in the other liquid crystal lens unit 10. As shown in FIG. 13, the first group of strip-shaped electrodes 4 in one liquid crystal lens unit 10 is adjacent to the first group of strip-shaped electrodes 4 in another liquid crystal lens unit 10.

Please be noted that FIGS. 12 and 13 only show one group of strip-shaped electrodes includes 4 layers of sub-electrodes; and the other group of strip-shaped electrodes includes 3 layers of sub-electrodes. Actually, it is feasible to set the number of layers of sub-electrodes as required.

The planoconvex lenses are formed by different arrangement, for forming the different lens gratings and a desired liquid crystal lens.

An embodiment of the present invention also provides a display apparatus, including the liquid crystal lens as described above and a display panel, wherein the liquid crystal lens is provided at a light exiting face of the display panel.

Please be noted that the display apparatus in the present embodiment can be any product or component having display function, such as electrical paper, mobile phone, flat panel computer, television, notebook computer, digital photo frame, navigator or the like.

Also, please be noted that in the drawings, for sake of clarity, the sizes of some layer and region might be exaggerated. Furthermore, it should be understood that when an element or a layer is called as "on" another element or layer, it means that it may directly be located on another element or there might be a middle layer between them. In addition, it should be understandable that when the element or layer is called as "below" another element or layer, it means that it can be directly located below another element or there might be at least one middle layer or element. In addition, it also should be understood that when the layer or element is called between the two layers or two elements, it means that it can be the only layer between the two layers or the only layer between the two elements, or there also might be at least one middle layer or element. The similar reference numbers throughout the description indicate the similar elements.

The technical solutions of embodiments of the present invention are described in detail above with reference to the accompanying drawings. Taking into consideration of the liquid crystal lens in the prior art, in the case that there is a certain angle between the simulated section and the light transmission axis of the 2D display panel, it is difficult to ensure the formed planoconvex lens to have relative high symmetry and phase delay. Embodiments of the present invention provide a liquid crystal lens, and the planoconvex lens is formed by two groups of strip-shaped electrodes having a multiple layer structure. In addition, factors such as charging voltage of electrodes, the thickness of electrode, the width of the electrode and the thickness of the insulation layer or the like can be considered comprehensively, so that in the case that there is an angle between the direction of simulated section and the light transmission axis of the 2D display panel, the planoconvex lens in the formed liquid crystal lens still has relatively high symmetry, thereby only generating relative low crosstalk and relative large phase delay.

In the present context, the term "first", "second" and "third" only are intended for description, rather than to interpret the indication or suggestion of the relative importance.

The term "plurality" is meant to two or more, unless clearly defined otherwise.

The above preferred embodiments are only used to explain the present invention, rather than to make limitation to the present invention. The ordinary skilled person in the relevant technical field can also make various changes and modification, without departing apart from the spirit and scope of the present invention. Therefore, all the modification, equivalent alternatives and improvements also belong to the scope of the present invention, and the scope of the present invention should be defined by the pending claims.

What is claimed is:

1. A liquid crystal lens, comprising:
    a first substrate;
    a second substrate arranged to be opposite to the first substrate, wherein a common electrode is provided on the second substrate;
    a liquid crystal layer interposed between the first and second substrates and comprising a plurality of liquid crystal molecules;
    a plurality of liquid crystal lens units, each of which comprises a first group of strip-shaped electrodes and a second group of strip-shaped electrodes different from the first group of electrodes and which are parallel to each other and spaced apart on the first substrate, wherein the first group of strip-shaped electrodes, the second group of strip-shaped electrodes and the common electrode are configured to form a planoconvex lens within the liquid crystal molecules between the common electrode and the first and second groups of strip-shaped electrodes in recponse to an applied voltage,
    wherein each of the first and second groups of strip-shaped electrodes comprises a plurality of layers of sub-electrodes insulated from each other, the sub-electrodes of the first group of strip-shaped electrodes and the sub-electrodes of the second group of strip-shaped electrodes are configured to adjust symmetry of the planoconvex lens in response to an applied voltage;
    wherein in at least one layer of the plurality of layers of sub-electrodes, a width of the sub-electrode within the first group of strip-shaped electrodes is different from a width of the sub-electrode within the second group of strip-shaped electrodes;
    a number of layers of sub-electrodes within the first group of strip-shaped electrodes is different from a number of layers of sub-electrodes within the second group of strip-shaped electrodes.

2. The liquid crystal lens as claimed in claim 1, wherein in each layer of the plurality of layers of sub-electrodes, the width of the sub-electrode within the first group of strip-shaped electrodes is different from the width of the sub-electrode within the second group of strip-shaped electrodes.

3. The liquid crystal lens as claimed in claim 1, wherein a spacing between adjacent sub-electrodes within the first group of strip-shaped electrodes is different from a spacing between adjacent sub-electrodes within the second group of strip-shaped electrodes.

4. The liquid crystal lens as claimed in claim 1, wherein the sub-electrodes within each of the first and second groups of strip-shaped electrodes have different widths.

5. The liquid crystal lens as claimed in claim 1, wherein all of layers of sub-electrodes in the first group of strip-shaped electrodes have projections coinciding with each other on the first substrate at an end of a side away from the second group of strip-shaped electrodes, and all of layers of sub-electrodes in the second group of strip-shaped electrodes have projections coinciding with each other on the first substrate at an end of a side away from the first group of strip-shaped electrodes.

6. The liquid crystal lens as claimed in claim 1, wherein an insulation part is provided between adjacent liquid crystal lens units.

7. A display apparatus, comprising the liquid crystal lens as claimed in claim 1, and a display panel, wherein the liquid crystal lens is provided on a light exiting face of the display panel.

8. The display apparatus as claimed in claim 7, wherein in each layer of the plurality of layers of sub-electrodes, the width of the sub-electrode within the first group of strip-shaped electrodes is different from the width of the sub-electrode within the second group of strip-shaped electrodes.

9. The display apparatus as claimed in claim 7, wherein a spacing between adjacent sub-electrodes within the first group of strip-shaped electrodes is different from a spacing between adjacent sub-electrodes within the second group of strip-shaped electrodes.

10. The display apparatus as claimed in claim 7, wherein the sub-electrodes within each of the first and second groups of strip-shaped electrodes have different widths.

11. The display apparatus as claimed in claim 7, wherein all of layers of sub-electrodes in the first group of strip-shaped electrodes have projections coinciding with each other on the first substrate at an end of a side away from the second group of strip-shaped electrodes, and all of layers of sub-electrodes in the second group of strip-shaped electrodes have projections coinciding with each other on the first substrate at an end of a side away from the first group of strip-shaped electrodes.

12. The display apparatus as claimed in claim 7, wherein an insulation part is provided between adjacent liquid crystal lens units.

* * * * *